(12) United States Patent
Takaishi

(10) Patent No.: US 7,394,613 B2
(45) Date of Patent: Jul. 1, 2008

(54) CONTROL DEVICE, DISK DEVICE, AND SEEK ORBIT GENERATION METHOD

(75) Inventor: Kazuhiko Takaishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 224 days.

(21) Appl. No.: 11/477,091

(22) Filed: Jun. 28, 2006

(65) Prior Publication Data

US 2007/0206316 A1 Sep. 6, 2007

(30) Foreign Application Priority Data

Mar. 3, 2006 (JP) ............................. 2006-057204

(51) Int. Cl.
*G11B 5/596* (2006.01)

(52) U.S. Cl. .............. 360/78.09; 360/78.06; 360/78.04; 360/77.02

(58) Field of Classification Search ............ None
See application file for complete search history.

(56) References Cited

U.S. PATENT DOCUMENTS

| | | | |
|---|---|---|---|
| 5,151,639 A | | 9/1992 | Hasegawa et al. |
| 5,469,414 A | | 11/1995 | Okamura |
| 6,831,809 B2 * | | 12/2004 | Kagami et al. ........... 360/78.09 |
| 2003/0072102 A1 | | 4/2003 | Kisaka |
| 2004/0240102 A1 | | 12/2004 | Atsumi et al. |
| 2005/0078405 A1 * | | 4/2005 | Baek et al. ................ 360/78.04 |
| 2006/0082922 A1 * | | 4/2006 | Shih ......................... 360/78.06 |
| 2006/0158773 A1 * | | 7/2006 | Semba et al. ............. 360/78.06 |

FOREIGN PATENT DOCUMENTS

| | | |
|---|---|---|
| EP | 0 441 407 | 8/1991 |
| EP | 0 774 754 | 5/1997 |
| EP | 1 480 202 | 11/2004 |
| JP | 5-143165 | 6/1993 |
| JP | 2657561 | 6/1997 |
| JP | 2736715 | 1/1998 |

OTHER PUBLICATIONS

Eiji Okamura; DSP Technology in Hard Disk Drives; pp. 38-45; Electronics; Nov. 1996.

* cited by examiner

*Primary Examiner*—Andrew L. Sniezek
(74) *Attorney, Agent, or Firm*—Greer, Burns & Crain, Ltd.

(57) ABSTRACT

A waveform generator generates an acceleration orbit, a velocity orbit, and a position orbit from the seek time. Each orbits multiplied by respective gains, whereupon the orbits are synthesized by a first adder. The resulting composite orbit is multiplied by a seek distance and then passed through a FIR filter to obtain the target position orbit that is to be applied to the later-stage two-degree-of-freedom control system. The two-degree-of-freedom control system has a characteristic whereby it is able to approximate a second-order low-pass filter.

15 Claims, 17 Drawing Sheets

FIR FILTER CHARACTERISTIC

FIR FILTER CHARACTERISTIC

US 7,394,613 B2

CONTROL DEVICE, DISK DEVICE, AND SEEK ORBIT GENERATION METHOD

CROSS-REFERENCE TO RELATED APPLICATIONS

This application is based upon and claims the benefit of priority from the prior Japanese Patent Application No. 2006-057204, filed on Mar. 3, 2006, the entire contents of which are incorporated herein by reference.

BACKGROUND OF THE INVENTION

1. Field of the Invention

The present invention relates to a control device for positioning a head in a target position, a disk device, and a seek orbit generation method, and more particularly to a control device which performs seek control by supplying a two-degree-of-freedom control system with a target position orbit, a disk device, and a generation method for generating the target position orbit.

2. Description of the Related Art

With a disk device for a disk such as an optical disk or magnetic disk, it is extremely important to position the head in a target position accurately. An example of such positioning control is seek control.

A positioning control system having a driving unit which moves a controlled body, and a calculation control unit which controls the driving unit has been disclosed as an example of the related art of seek control. In this system, a target position, a target velocity, and a target acceleration are expressed respectively by time-related, fixed polynomials, and the driving unit is controlled by having the calculation control unit calculate the target position and so on at regular sample time intervals (for example, Japanese Patent No. 2657561 and Japanese Patent No. 2736715).

A method of performing seek control while estimating a head velocity using an observer by supplying a two-degree-of-freedom control system with the head velocity has also been disclosed (for example, "DSP Technology in a Hard Disk Drive", Eiji Okamura, Electronics, November 1996, p 38-45).

However, in the prior art described above, there is no description of seek control performed by supplying a two-degree-of-freedom control system with a target position orbit. In particular, there is no description of a method of generating a target position orbit in real time.

Meanwhile, in a two-degree-of-freedom control system, a filter may be constituted by an inverse function of a transfer function constituting a feedback loop to realize an ideal control circuit in which the relationship between a target position orbit r and an observation position y is y/r=1. However, when the filter is thus constituted, high frequency noise is amplified infinitely, and hence realization is impossible.

Also in a two-degree-of-freedom control system, a transfer function from the target position orbit to the observation position may be approximated by a second-order low-pass filter (LPF). However, when the target position orbit is varied in stepped form, the current of the driving unit for driving the head may not be symmetrical between the acceleration area and deceleration area, depending on the constitution of a second-order LPF, and hence seek control takes a great deal of time.

SUMMARY OF THE INVENTION

The present invention has been designed in consideration of the problems described above, and it is an object thereof to provide a control device which is capable of performing seek control using a two-degree-of-freedom control system to which a target position orbit can be supplied, a disk device, and a seek orbit generation method for generating the target position orbit.

Another object of the present invention is to provide a control device and so on with which the seek time of a head can be reduced even with such the two-degree-of-freedom control system.

To achieve the above objects, the present invention is a control device for positioning a head by driving an actuator on which the head is carried, having an orbit generation unit which generates three orbits of a target position, a target velocity, and a target acceleration corresponding to an elapsed time from a seek start time of the head, a composition unit which compounds the three orbits generated by the orbit generation unit, and a FIR filter for generating a target position orbit to be supplied to a two-degree-of-freedom control unit from a composite orbit output from the composition unit.

In the control device of the present invention, the two-degree-of-freedom control unit performs seek control on the head by driving the actuator using the target position orbit.

Also in the control device of the present invention, the orbit generation unit generates the three orbits which are expressed by polynomials of an elapsed time from a movement start time of the head.

Also in the control device of the present invention, the polynomials are expressed as $X_3 \propto (t/T) \times (t/T - 0.5) \times (t/T - 1)$, $X_2 = \int X_3 dt$, and $X_1 = \int \int X_3 dt^2$, where $X_3$ is the target acceleration, $X_2$ is the target velocity, $X_1$ is the target position, t is the elapsed time from the seek start time, and T is a seek time.

Also in the control device of the present invention, the polynomials are expressed as $X_3 \propto (t/T)^p \times (t/T - 0.5) \times (t/T - 1)^p$, $X_2 = \int X_3 dt$, and $X_1 = \int \int X_3 a dt^2$, where $X_3$ is the target acceleration, $X_2$ is the target velocity, $X_1$ is the target position, t is the elapsed time from the seek start time, T is a seek time, and p is an exponentiation number.

Also in the control device of the present invention, the orbit generation unit generates the three orbits which are expressed by any one of a rectangular wave, a sinusoidal wave, and a trapezoidal wave.

Also in the control device of the present invention, the orbit generation unit has a table storing the three orbits, and generates the three orbits by reading each of the three orbits from the table in accordance with the elapsed time.

Further, to achieve the above objects, the present invention is a disk device for positioning a head on a disk, having an actuator for driving the head, an orbit generation unit which generates three orbits of a target position, a target velocity, and a target acceleration corresponding to an elapsed time from a seek start time of the head, a composition unit which compounds the three orbits generated by the orbit generation unit, a FIR filter for generating a target position orbit from a composite orbit output from the composition unit, and a two-degree-of-freedom control unit which performs seek control on the head by driving the actuator using the target position orbit.

Furthermore, to achieve the above objects, the present invention is a seek orbit generation method for generating a seek orbit in order to position a head by driving an actuator on which the head is carried, having the steps of generating three orbits of a target position, a target velocity, and a target acceleration corresponding to an elapsed time from a seek start time of the head, compounding the generated three orbits, and generating a seek orbit to be supplied to a two-degree-of-freedom control unit through a FIR filter from a compounded composite orbit.

Furthermore, to achieve the above objects, the present invention is a positioning control method for position-controlling a head by driving an actuator on which the head is carried, having the steps of generating three orbits of a target position, a target velocity, and a target acceleration corresponding to an elapsed time from a seek start time of the head, compounding the generated three orbits, generating a seek orbit through a FIR filter from a compounded composition orbit, and performing seek control on the head by driving the actuator in a two-degree-of-freedom control unit to which the generated seek orbit has been supplied.

The present invention is capable of providing a control device which is capable of performing seek control using a two-degree-of-freedom control system to which a target position orbit can be supplied, a disk device, and a seek orbit generation method for generating the target position orbit.

The present invention is also capable of providing a control device and so on with which the seek time of a head can be reduced even with such the two-degree-of-freedom control system.

DESCRIPTION OF THE PREFERRED EMBODIMENTS

A preferred embodiment of the present invention will be described below with reference to the drawings.

Figure 1:
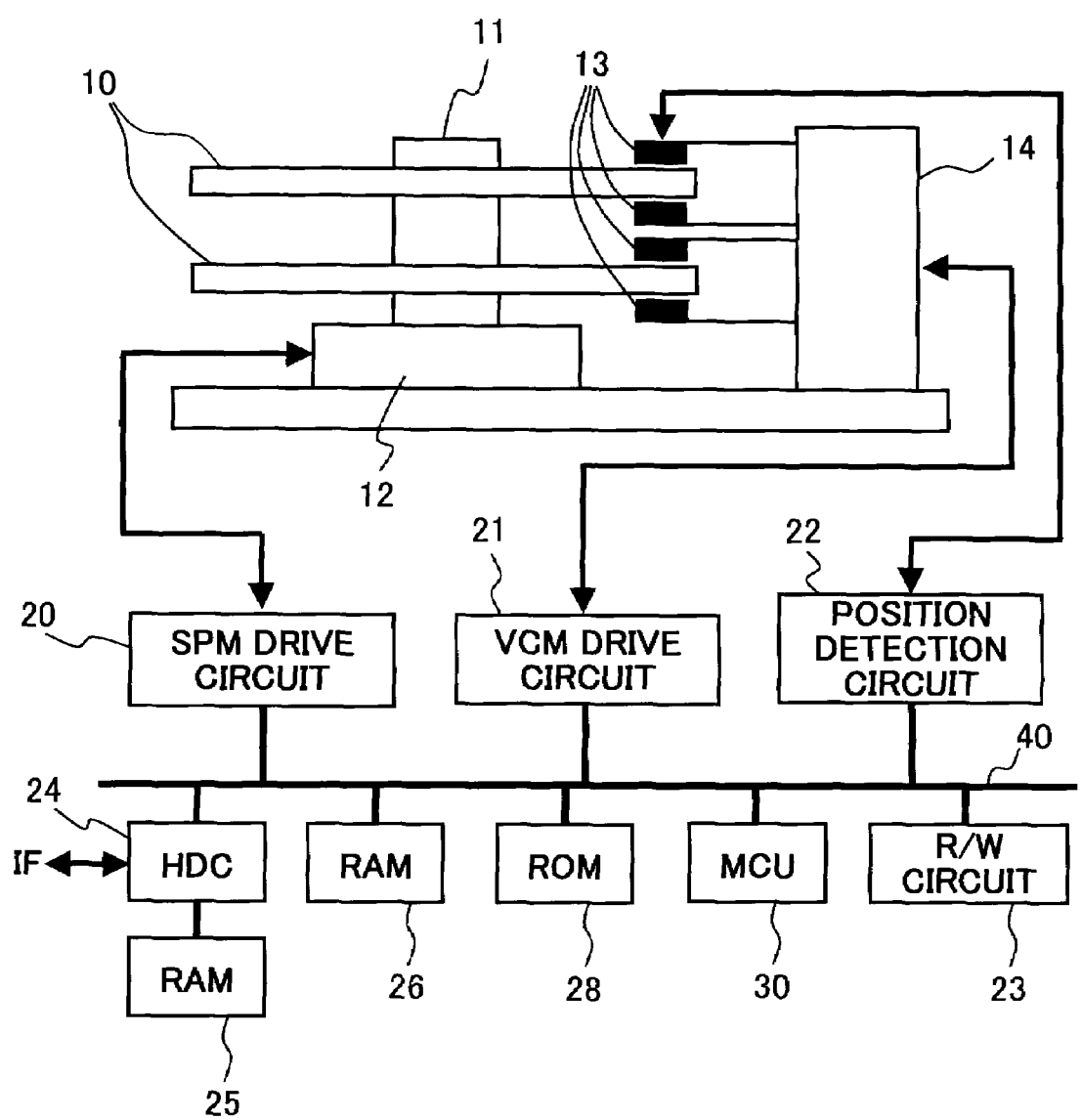
FIG. 1 shows a configuration example of a magnetic disk device to which the present invention is applied.

FIG. 1 shows a configuration example of a magnetic disk device to which the present invention is applied. A hard disk drive is used as an example of the disk device.

As shown in FIG. 1, the magnetic disk device 1 has a magnetic disk 10, a spindle motor 12, a magnetic head 13, and an actuator 14.

The magnetic disk 10 is disposed on a rotation axis 11 of the spindle motor 12. The spindle motor 12 rotates the magnetic disk 10 via the rotation axis 11.

The magnetic head 13 is comprised of read elements and write elements, and reads data from and writes data to the magnetic disk 10.

The actuator 14 is comprised of a voice coil motor (VCM, which rotates with an internal rotation axis as the center. The actuator 14 also has the magnetic head 13 on a tip end thereof, and is capable of moving the magnetic head 13 in the radial direction of the magnetic disk 10.

In the example shown in FIG. 1, two magnetic disks 10 are mounted on the magnetic disk device 1, and four magnetic heads 13 are simultaneously driven by the same actuator 14.

The magnetic disk device 1 further has a spindle motor (SPM) drive circuit 20, a voice coil motor (VCM) drive circuit 21, a position detection circuit 22, a read and write (R/W) circuit 23, a hard disk controller (HDC) 24, first and second random access memories (RAM) 25, 26, a read-only memory (ROM) 28, and a microcontroller (MCU) 30. Apart from the first RAM 25, these components are connected to each other via a bus 40.

The SPM drive circuit 20 drives the spindle motor 12 on the basis of a control signal from the MCU 30. The VCM drive circuit 21 supplies a drive current to the actuator 14, and drives the actuator 14, on the basis of the control signal from the MCU 30.

The position detection circuit 22 converts a position signal (servo signal hereafter) read by the magnetic head 13 from the magnetic disk 10 into a digital signal. The R/W circuit 23 controls the reading and writing operations of the magnetic head 13.

The HDC 24 judges a position within a track based on the sector number of the servo signal, and records and reproduces data. The HDC 24 communicates with a host via interface (IF) such as by ATA or SCSI.

The first RAM 25 is a memory for the HDC 24, and temporarily stores read data read by the magnetic head 13 and write data to be written to the magnetic disk 10 by the magnetic head 13. The second RAM 26 is a memory for the MCU 30, and temporarily stores data used by the MCU 30 to perform various calculations.

The ROM 28 stores a control program of the MCU 30 and so on. By reading and executing the control program, the MCU 30 generates a position orbit of the magnetic head 13 and performs seek control through two-degree-of-freedom control using an observer for estimating the position of the magnetic head 13. This will be described in detail hereafter.

Figure 2:
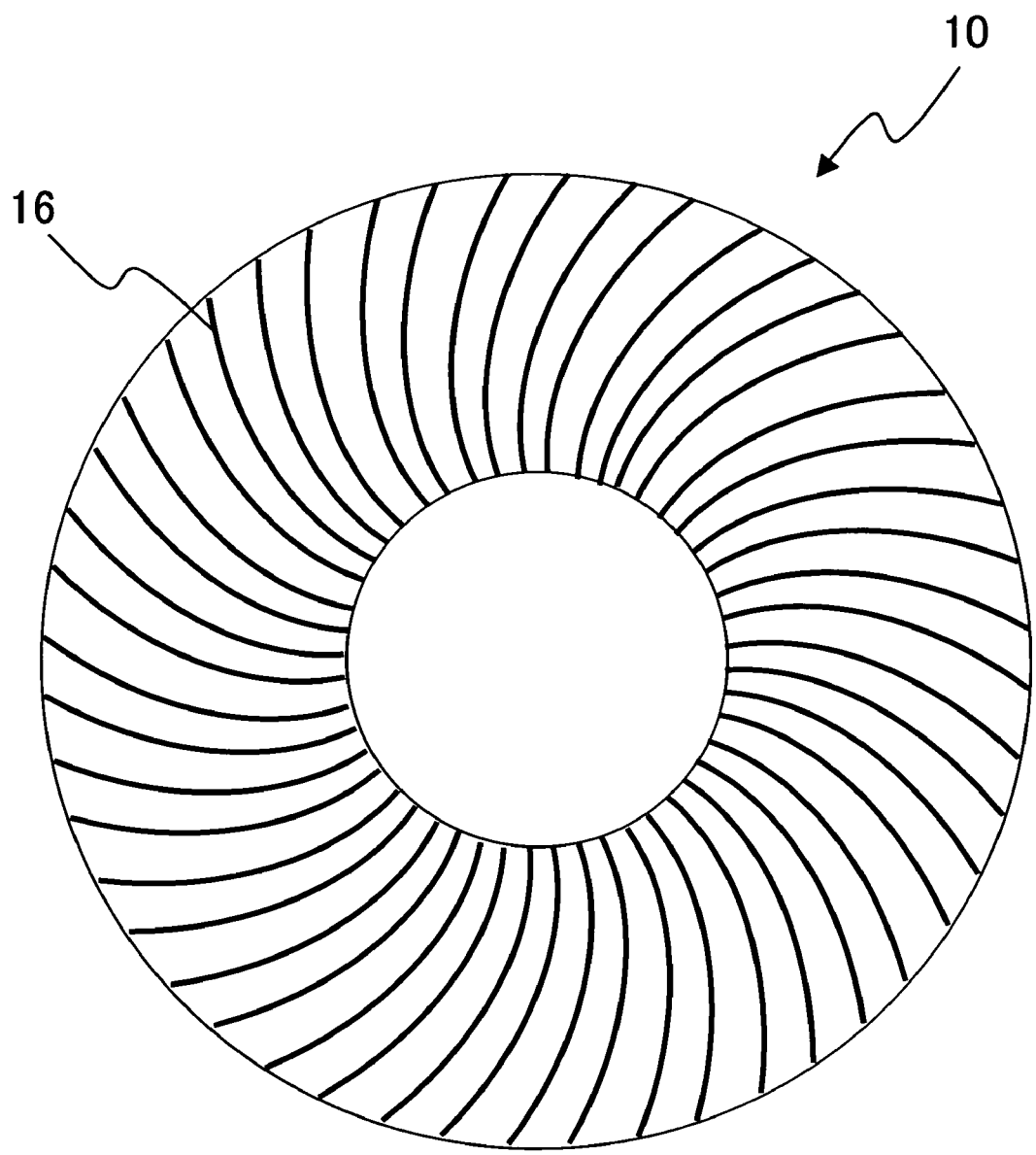
FIG. 2 shows an example of the recorded positions of position signals recorded on the magnetic disk.

FIG. 2 shows an example of the arrangement of position signal (servo signal) 16 recorded on the magnetic disk 10. As shown in FIG. 2, the servo signals 16 are arranged at equal intervals from the inner perimeter to the outer perimeter of the magnetic disk 10. The magnetic disk device 1 can detects the current position of the magnetic head 13 and so on by reading the servo signal 16.

Figure 3:
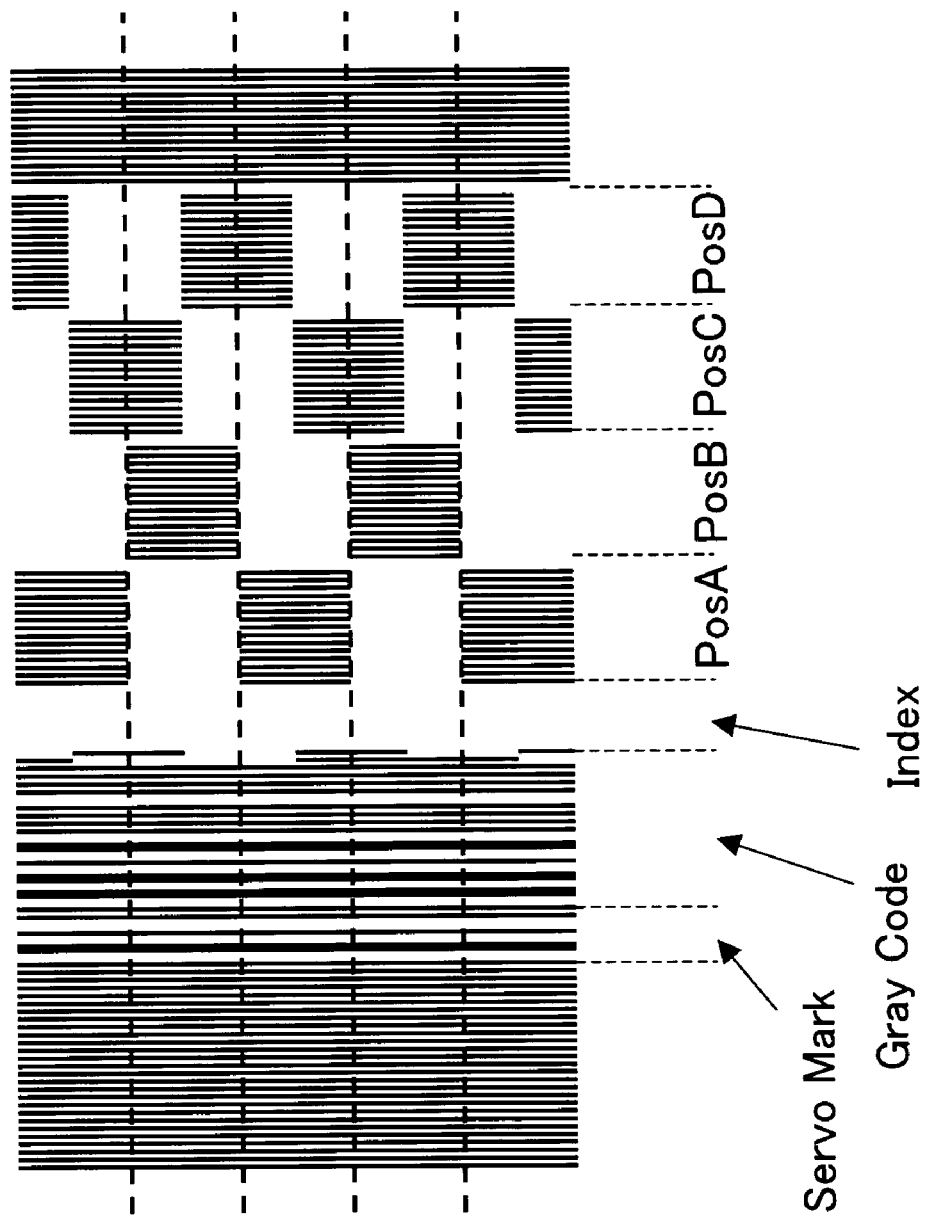
FIG. 3 shows an example of a position signal recording format.

FIG. 3 shows an example of a recording format of the servo signal 16. As shown in FIG. 3, the servo signal is comprised of a servo mark (Servo Mark) indicating a starting position of the servo signal, a gray code (Gray Code) indicating a track number, an Index signal (Index) indicating an index of the servo signal, and four offset signals (PosA, PosB, PosC, PosD).

Figure 4:
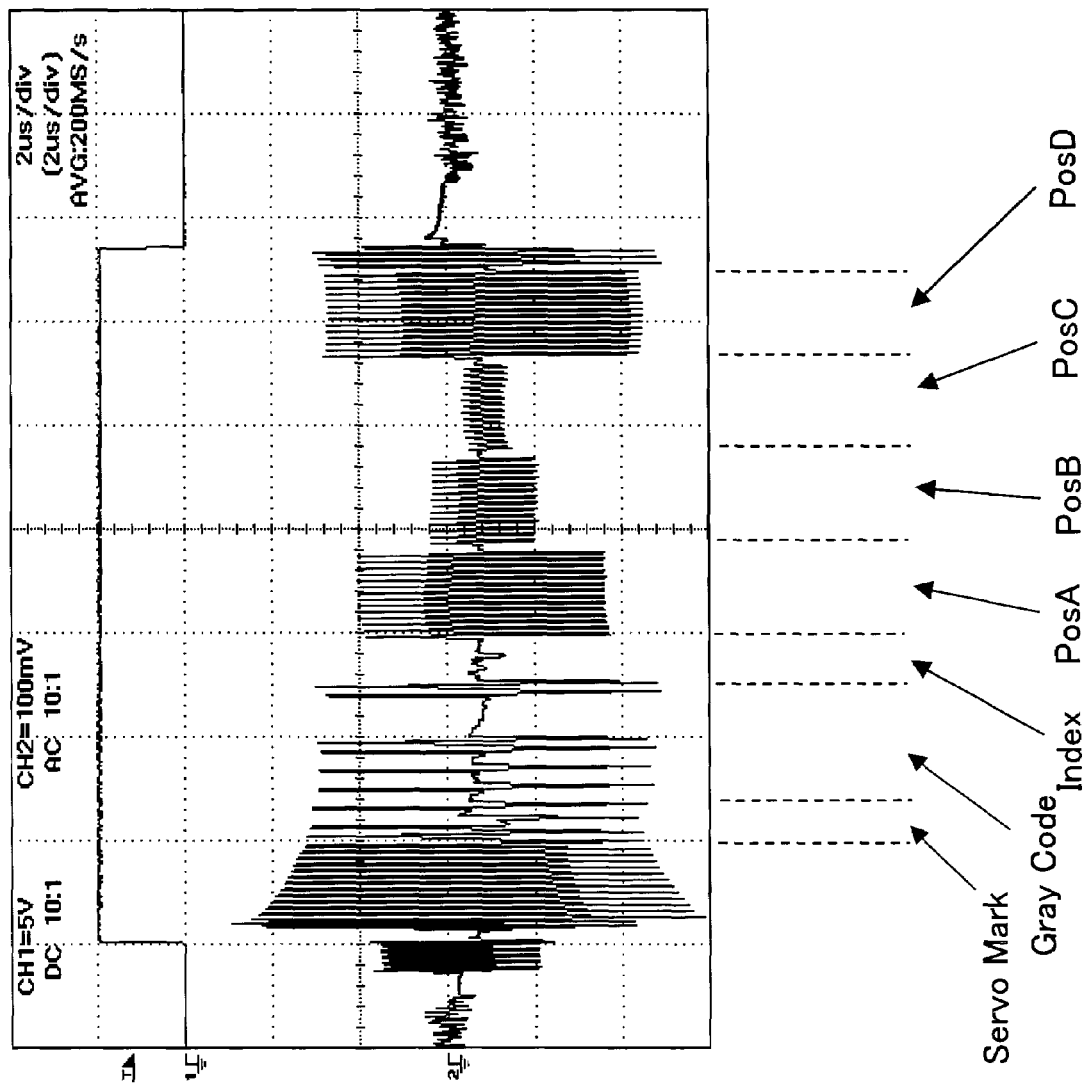
FIG. 4 shows an example of a waveform diagram obtained when a position signal is read.

FIG. 4 shows an example of a signal waveform diagram obtained when the servo signal 16 is read by the magnetic head 13. The MCU 30 detects the position of the magnetic head 13 using this type of waveform.

More specifically, the radial direction position of the magnetic head 13 is detected by the MCU 30 using the track number Gray Code and the offset signals PosA to PosD.

A circumference direction position of the magnetic head 13 is detected from the index signal Index. For example, the MCU 30 sets the sector number to "0" upon detection of the index signal Index, and obtains each sector number of the track by incrementing the sector number every time a servo signal is detected.

Figure 5:
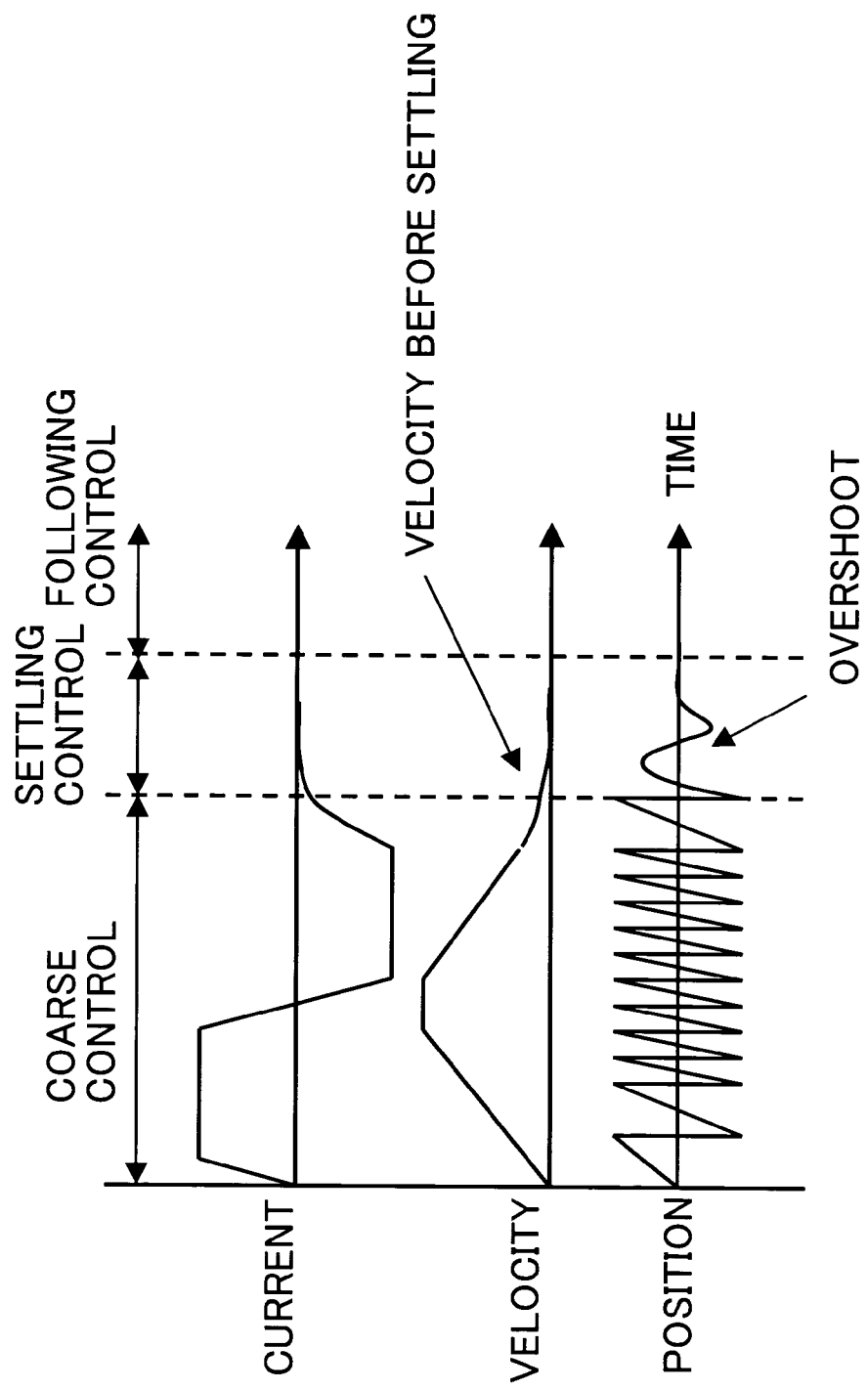
FIG. 5 is an illustrative view of a seek operation.

FIG. 5 shows an example of seek control of the actuator 14, performed by the MCU 30. FIG. 5 shows the transitions of seek control for moving the magnetic head 13 from a certain track position to a target track position, the current flowing through the actuator 14, the movement velocity of the magnetic head 13, and the position of the magnetic head 13.

The magnet head 13 can be moved to the target position by transiting as coarse control, setting control, and following control. The coarse control is velocity control to the target position, while the settling control and following control are position control to the target position.

In this embodiment, seek control of the magnetic head 13 is performed using two-degree-of-freedom control system which is constructed by a feedback loop supplied a target position and feeding back an observation position, furthermore, by a filter passing through the target position.

Figure 6A:
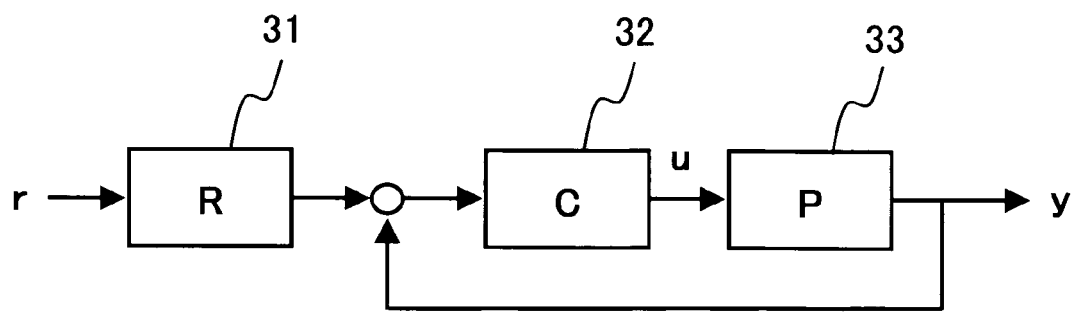
FIG. 6A shows a configuration example of a two-degree-of-freedom control system.

FIG. 6A shows a configuration example of the two-degree-of-freedom control system. The two-degree-of-freedom control system is a control system for obtaining the observation position y from the target position r. The two-degree-of-freedom control system is constructed by the feed back loop in which the target position r is applied, a current value u from the MCU 30, which serves as a controller (C) 32, is applied to the actuator 14, which serves as a plant (P) 33, and the observation position y is re-supplied to the controller (C) 32. In this case, a filter (R) 31 for obtaining ideal input and output (such that the magnetic head 13 moves to the target position r as soon as the target position r is supplied) in which the relationship between the target position r and observation position y is $$y/r=1 \quad (1)$$

is preferably constituted as $$(1+CP)/CP \quad (2)$$

However, when high frequency noise is included in the target position r, observation position y, and so on, the noise is amplified infinitely.

Figure 6B:
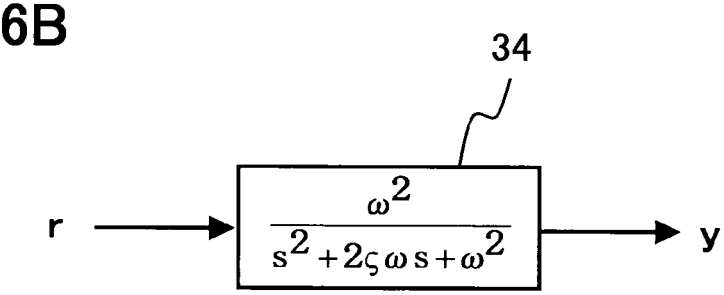
FIG. 6B shows a configuration example in which FIG. 6A approximates a second-order LPF.

Meanwhile, the two-degree-of-freedom control system shown in FIG. 6A is capable of approximating the second-order low-pass filter (LPF) shown in FIG. 6B. In other words, a response from the target position r to the observation position y can be expressed as $$y/r=\omega^2/(s^2+2\zeta\omega s+\omega^2) \quad (3)$$

On the right side of the numeral, s is a operator of a Laplace transformation, ω is an angular frequency, and ζ is an attenuation ratio.

Figure 6C:
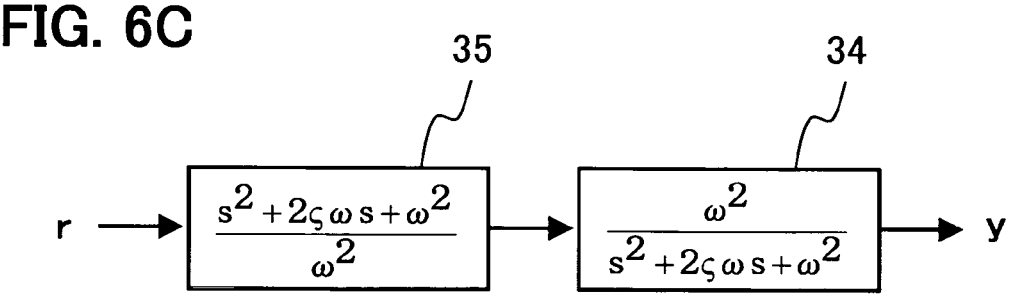
FIG. 6C shows a configuration example of a control system including an inverse function.

Here, $$(s^2+2\zeta\omega s+\omega^2)/\omega^2 \quad (4)$$

is applied to the control system shown in FIG. 6B as an inverse function 35 applied to the target position r. In other words, as shown in FIG. 6C, the target position r is passed through the inverse function 35 shown in Equation (4), and then applied to the original control system 34. At this time, y/r=1 is established and the desired response can be realized.

The constitution of the inverse function 35 shown in Equation (4) will now be discussed. The symbol s is the operator of the Laplace transformation, the symbol s can be expressed as $$s=d/dt \quad (5)$$

Accordingly, Equation (4) can be transformed into $$s^2/\omega^2+2\zeta s/\omega+1=d^2/dt^2\times1/\omega^2+d/dt\times2\zeta/\omega+1 \quad (6)$$

Here, when the target position r is multiplied by the right side of Equation (6), $$d^2r/dt^2\times1/\omega^2+dr/dt\times2\zeta/\omega+r \quad (7)$$

is obtained. Hence, Equation (4) may also be expressed by a position orbit corresponding to inverse function=GainA×(acceleration of r)+GainV× (velocity of r)+r (8)

Here, GainA=1/ω², GainV=2ζ/ω

Figure 7:
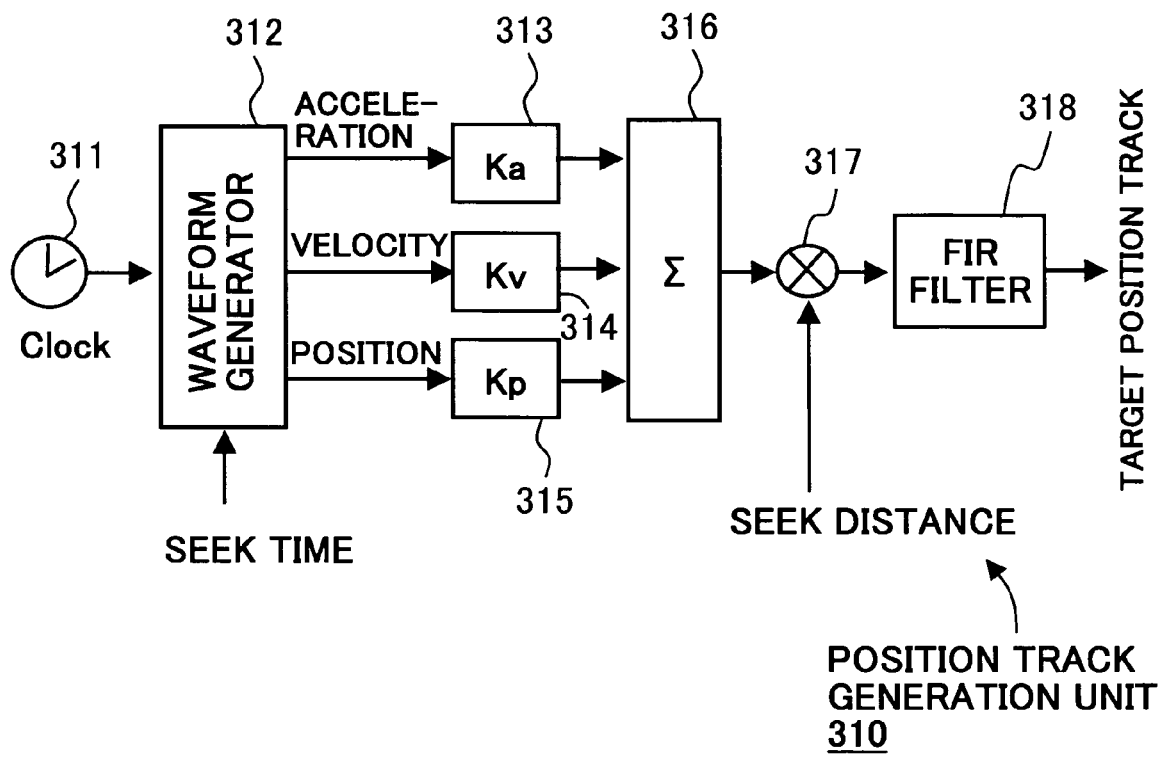
FIG. 7 shows a configuration example of a position orbit generation unit.

FIG. 7 is a configuration example of a position orbit generation unit 310 which generates the target position orbit, and corresponds to Equation (8). This unit 310 corresponds to the inverse function 35 of FIG. 6C (or the filter (R) 31 of FIG. 6A). The position orbit generation unit 310 is constituted by a program which is stored in the ROM 28 and executed by the MCU 30.

The position orbit generation unit 310 has a clock 311, a waveform generator 312, gain multipliers 313 to 315, a first adder 316, a seek distance multiplier 317, and a FIR filter 318.

The clock 311 generates a clock at sample time intervals, for example.

The waveform generator 312 generates a waveform corresponding to the seek time every clock. More specifically, the waveform generator 312 generates and outputs a waveform for each of an acceleration orbit, a velocity orbit, and a position orbit in accordance with the elapsed time from a clock start time. In actuality, the waveform of each orbits may be generated by reading the waveform of each orbits stored in a table, or the orbits may be generated using polynomials corresponding to the elapsed time from a movement start time of the magnetic head 13. Examples of these polynomials will be provided below.

The gain multipliers 313 to 315 multiply the generated waveform of each orbit by respective gains Ka, Kv, Kp. The value of each gain Ka, Kv, Kp is a coefficient value, and can be adjusted in accordance with a coefficient of the two-degree-of-freedom control system.

The first adder 316 adds together the waveforms obtained after multiplication with the gains Ka, Kv, Kp, and generate a composite orbit. This output corresponds precisely to Equation (6).

The seek distance multiplier 317 multiples the composite orbit obtained from the first adder 316 by a seek distance. The result corresponds precisely to Equation (7) or Equation (8).

The FIR filter 318 filters input waveform to converge the multiplied waveform to "0" within a finite time period. The output of the FIR filter 318 serves as the target position orbit (seek orbit). A FIR type filter is employed so that the target position orbit can be obtained within a finite time period referred to as the seek time.

Figure 8A:
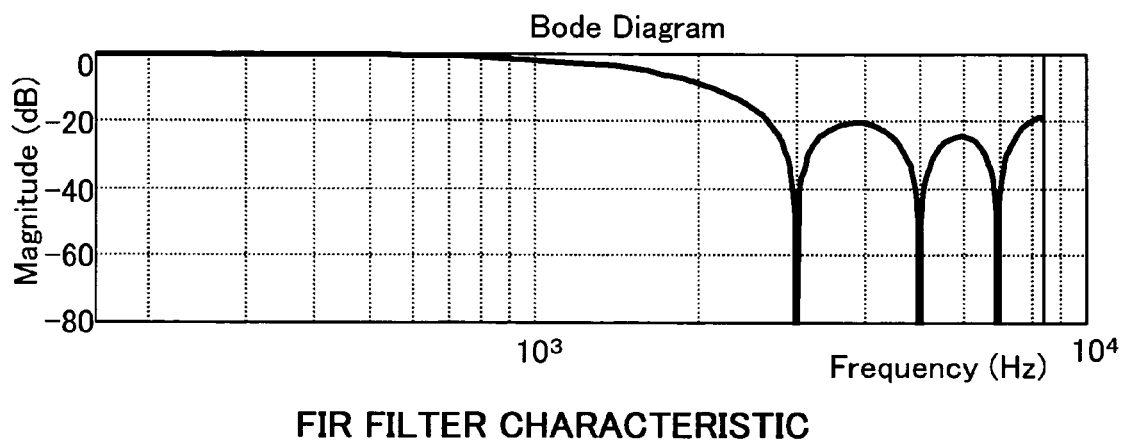
FIGS. 8A and 8B show examples of the characteristics of a FIR filter.
Figure 8B:
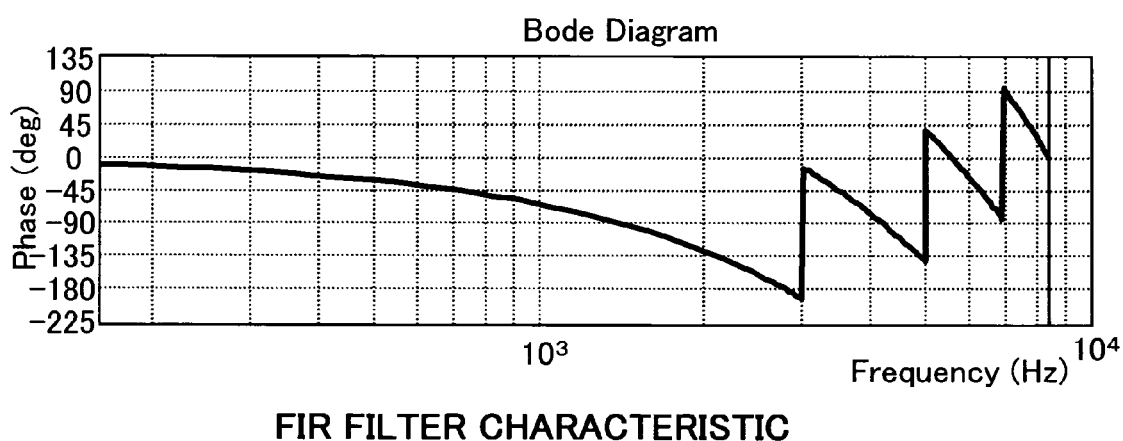

The frequency characteristics of the FIR filter 318 are shown in FIGS. 8A and 8B. The FIR filter 318 is constituted to block the vicinity of the resonance frequency in order to prevent resonance excitation.

Thus the acceleration orbit, velocity orbit, and position orbit are generated in accordance with the time elapsed from the seek start time, whereupon the three orbits are multiplied by the gains Ka, Kv, Kp in accordance with the coefficient of the second-order LPF approximation characteristic of the two-degree-of-freedom control system to obtain a total. The composite orbit is then passed through the FIR filter 318, and obtains the target position orbit to be supplied to the two-degree-of-freedom control system. As noted above, the constitution shown in FIG. 7 is capable of approximating the constitution of the inverse function of the transfer function of the two-degree-of-freedom control system, and hence the control system is capable of outputting the observation position following supply of the target position orbit in a desired shape. In other words, by means of this constitution, seek control can be performed using the two-degree-of-freedom control system to which the target position orbit can be supplied. Furthermore, by passing the composite orbit through the FIR filter 318, the target position orbit can be generated within a finite time period.

Note that the position orbit generation unit 310 is capable of setting a target movement time in accordance with the movement distance of the magnetic head 13. For example, the target movement time can be set by adjusting the seek time input into the waveform generator 312.

Figure 9:
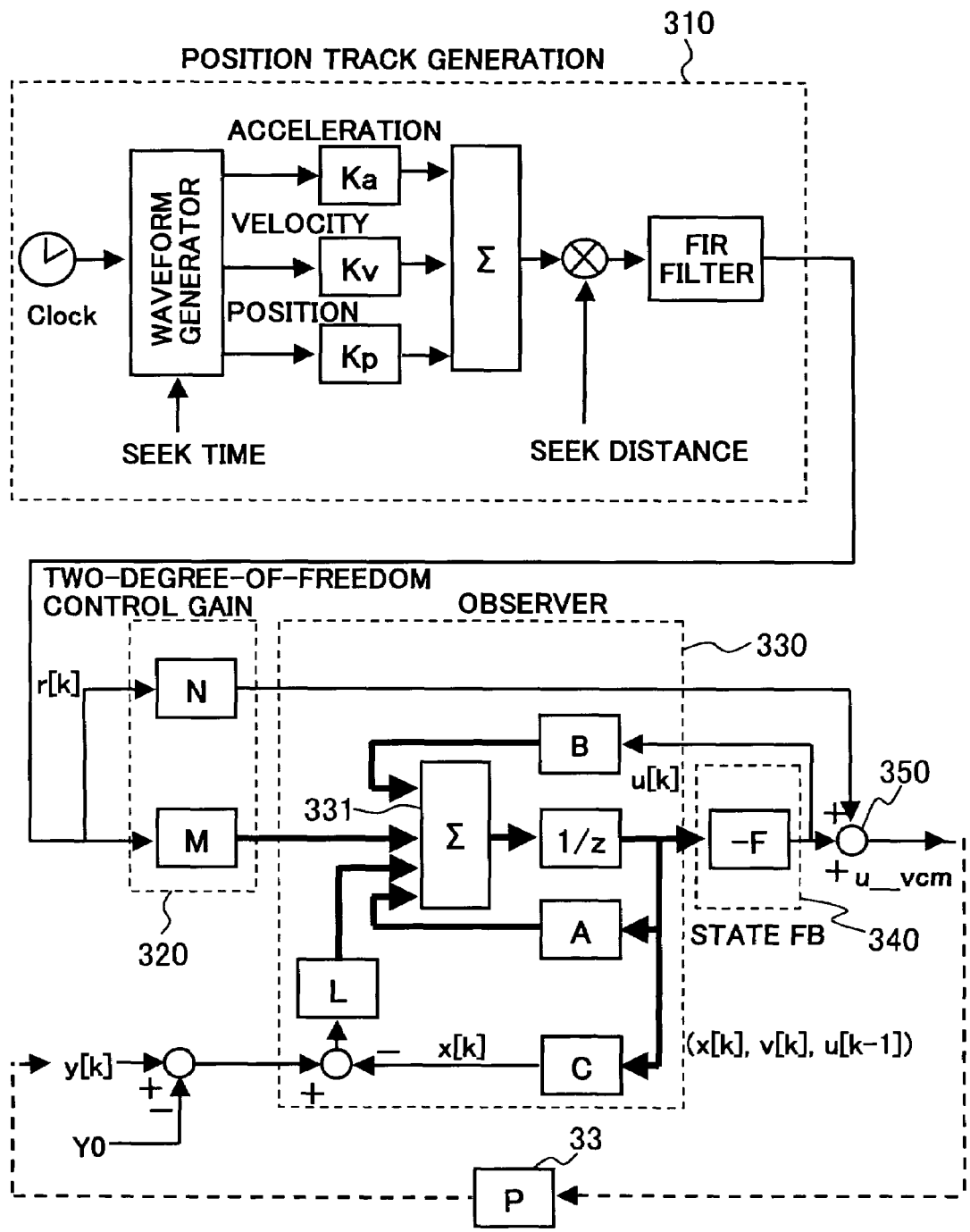
FIG. 9 shows a configuration example of a two-degree-of-freedom control system including an observer control system.

FIG. 9 shows a configuration example of a control system employing observer control in a two-degree-of-freedom control system. A forecast observer and a current observer exist as methods for realizing observer control during digital control. Here, a forecast observer format, in which the observer control of analog control is applied as is to digital control, will be described. However, the two-degree-of-freedom control system may be constituted similarly with the current observer. The two-degree-of-freedom control system shown in FIG. 9 has entirely the position orbit generation unit 310, a two-degree-of-freedom control gain multiplication unit 320, an observer control unit 330, and a state feedback unit 340.

The position orbits generation unit 310 is identical to that of FIG. 8. The position orbits generation unit 310 outputs the target position orbit r [k].

The two-degree-of-freedom control gain multiplication unit 320 has two multiplication units, and outputs result of multiplying the target position orbit r [k] by respective gains N, M. Note that in actuality, the gains N, M are expressed in matrix form.

The observer control unit 330 has a second adder 331 and a plurality of gain multipliers. The observer control unit 330 employs an identical calculation model to that of the actuator 14. When a current is caused to flow through the actuator 14, a corresponding current value is applied to the observer control unit 330 substantially simultaneously, and the calculation model is corrected by estimating the position of the magnetic head 13 (or the position of the actuator 14) upon application of the corresponding current value. Note that the thick lines in the observer control unit 330 shown in FIG. 9 denote vectors.

The second adder 331 has four inputs. The first input is a value obtained by multiplying a current u [k] by a matrix B, the second input is a value obtained by multiplying the target position orbit r [k] by a matrix M, the third input is a value obtained by multiplying a matrix L by a difference (error) between the observation position y [k] and an estimation position x [k] obtained upon operation of the observer control unit 330, and the fourth input is a value obtained by multiplying a state variable (x [k], v [k], u [k−1]) by a matrix A. The second adder 331 adds these values together and outputs the result. The output serves as a quantity of state (here, the position and velocity, i.e. x [k+1], v [k+1]) in the following sample.

Further, the observer control unit 330 multiplies the output of the second adder 331 by an operator 1/z, and outputs an estimated quantity of state (k [k], v [k]) at the present time.

The state feedback unit 340 multiplies the output of the observer control unit 330 by a matrix −F, and outputs the current u [k]. The state feedback unit 340 also outputs the output u [k] back to the observer control unit 330.

With this configuration, the output u [k] of the state feedback unit 340 and one of the outputs (N×r [k]) of the two-degree-of-freedom control gain multiplication unit 320 are added together, and a current u_vcm is outputted.

Note that the current u_vcm that is outputted with this configuration is applied to the actuator 14 serving as the plant (P) 33, as shown by the dotted-line arrow in FIG. 9. The observation position y [k] is output on the basis of the output from the actuator 14 (for example, the observation position is detected by the position detection circuit 22) and then input back into the observer control unit 330 of this configuration to form a feedback loop.

The two-degree-of-freedom control system to which the target position orbit r [k] can be supplied is provided by the configuration example described above, and thus seek control relating to the magnetic head 13 (or the actuator 14) can be realized.

Figure 10:
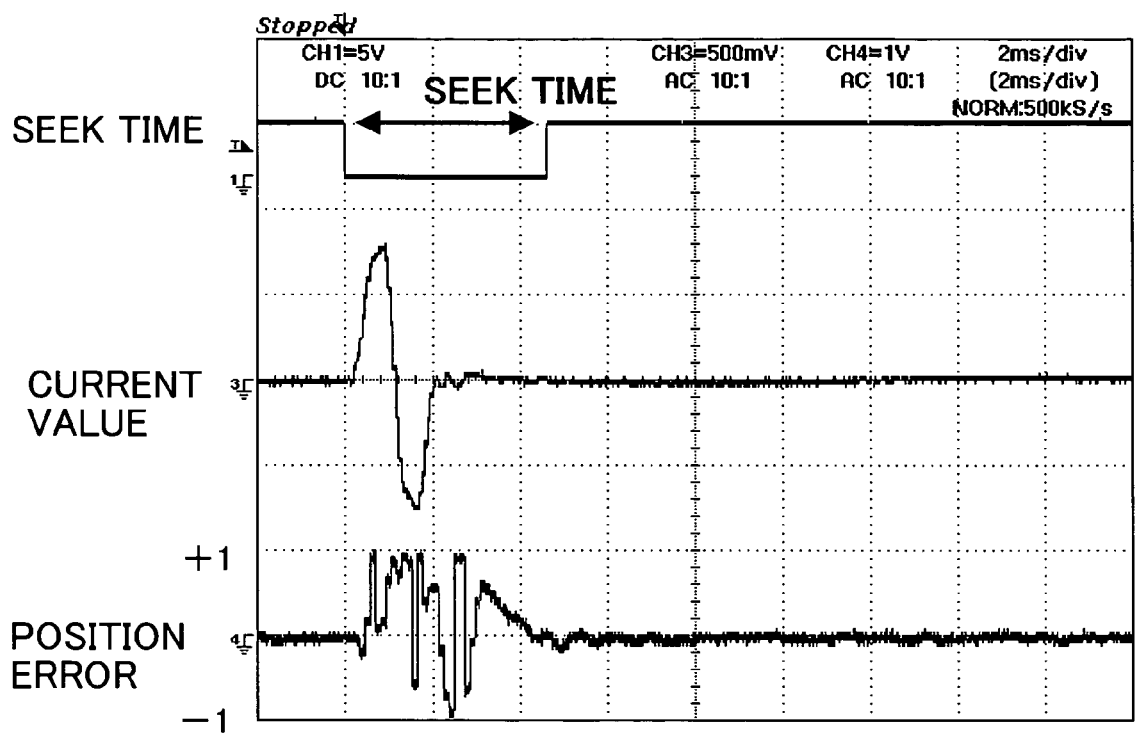
FIG. 10 shows an example of experiment results in the two-degree-of-freedom control system.
Figure 11:
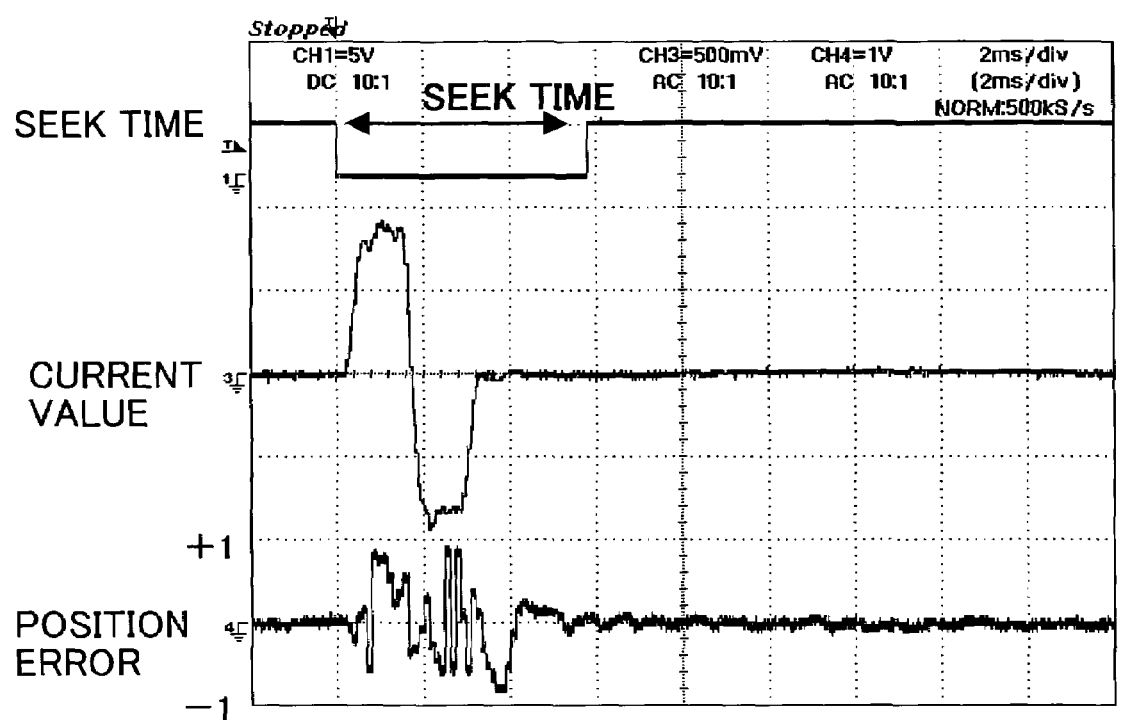
FIG. 11 shows an example of experiment results in the two-degree-of-freedom control system.
Figure 12:
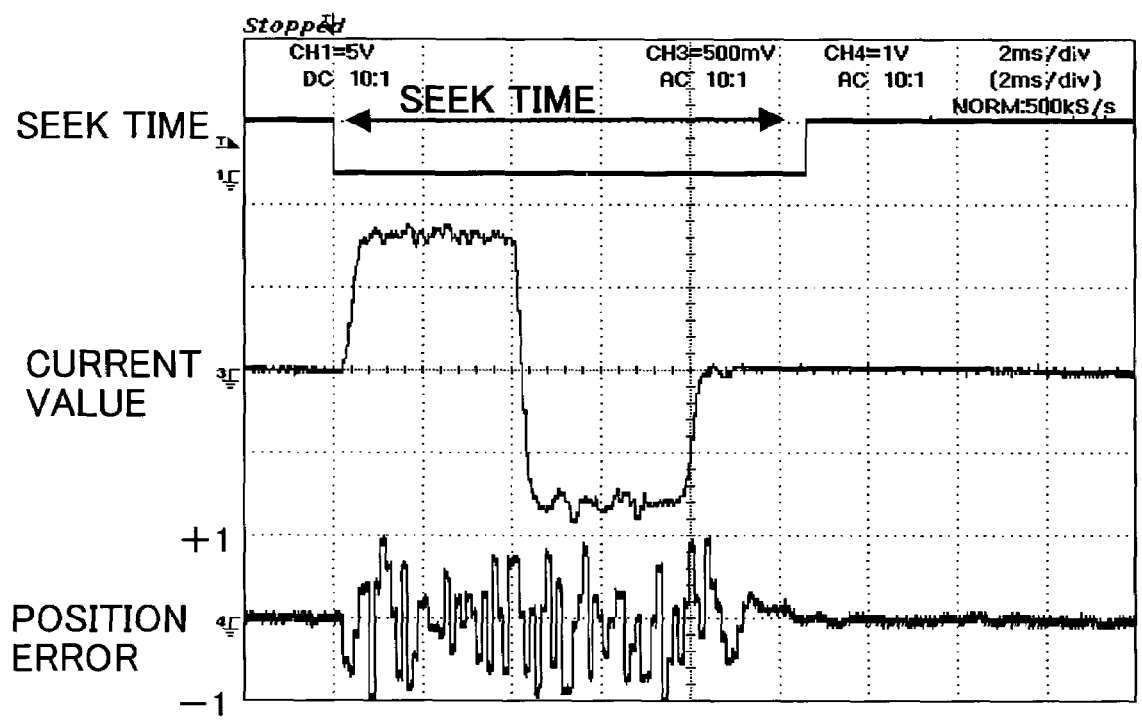
FIG. 12 shows an example of experiment results in the two-degree-of-freedom control system.

FIGS. 10 to 12 are graphs of experiment results indicating the manner in which the current value and position error change during the seek time. The graphs show examples of the manner in which the current output shown in FIG. 9 changes when the seek time is applied to the waveform generator 312 of the position orbit generation unit 310 shown in FIGS. 7 and 9, and the manner in which the position error up to the target position changes when the current is applied to the actuator 14.

As shown in FIG. 10, when the seek time shown on the upper section of the graph was applied, the output current took the form shown in the middle section of FIG. 10. Thus an ideal rectangular current waveform is obtained within the seek time. The target position orbit r [k] is applied after being passed through the FIR filter 318, and therefore the waveform thereof is slightly smooth. Hence, the current waveform also takes a slightly smooth rectangular wave shape.

The current flowing through the actuator 14 became substantially "0" during the seek time, thereby indicating the end of seek control. The position error shown in the lower section of FIG. 10 also became "0" substantially during the seek time. Hence, by means of this control configuration, the seek time of the magnetic head 13 to the target position can be reduced.

When the seek time was increased gradually, it was possible to obtain substantially identical waveforms to those of FIG. 10 for the current and position error, as shown in FIGS. 11 and 12. In all cases, it was possible to obtain an ideal current waveform. Thus the seek time can be reduced in this case also.

As is evident from the above description, with the two-degree-of-freedom control system shown in FIG. 9, seek control can be realized simply by supplying the target position orbit.

Figure 13A:
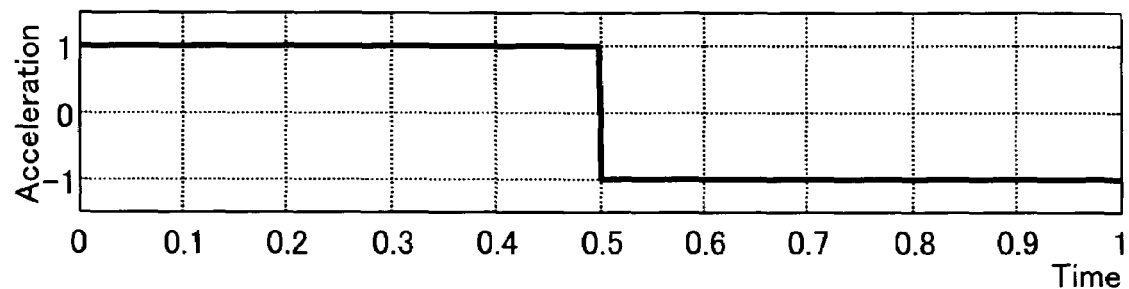
FIG. 13A shows an example of a rectangular wave.

The rectangular wave applied as the target position orbit is shown in FIG. 13A, for example. More specifically, in this rectangular wave, the acceleration changes from up to down. Note that both a horizontal and vertical axis is normalized to 1. This acceleration waveform is an example of the acceleration orbit output from the waveform generator 312. Each orbits of the velocity and position output from the waveform generator 312 take similar rectangular waveforms to that of the acceleration orbit.

Figure 13B:
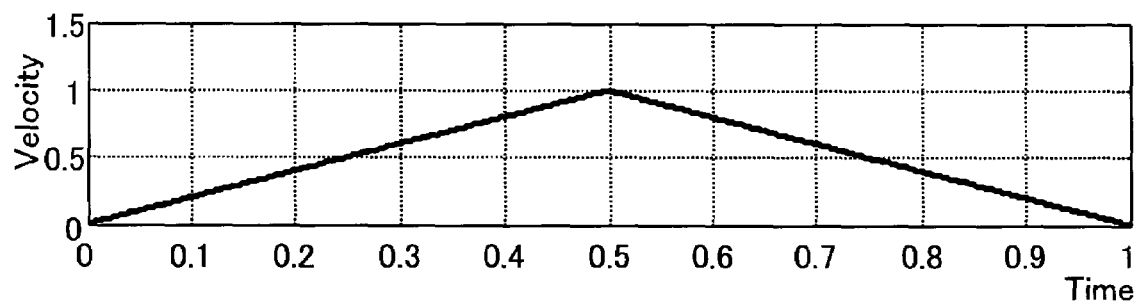
FIGS. 13B and 13C show examples of experiment results obtained when the rectangular wave shown in FIG. 13A is applied.
Figure 13C:
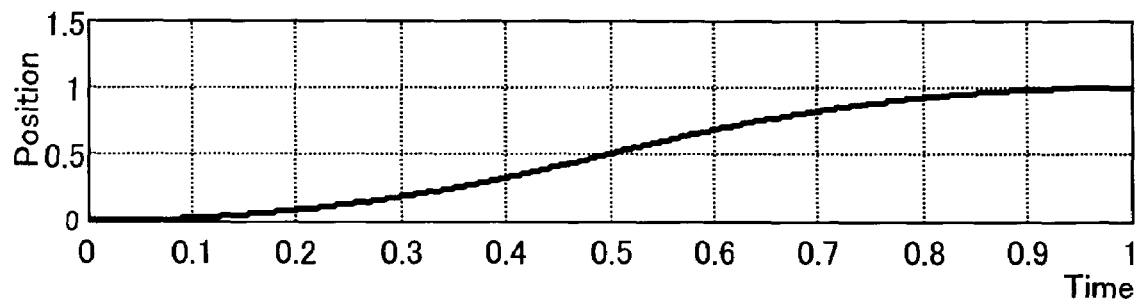

FIGS. 13B and 13C show graphs of the current flowing through the actuator 14 and the position of the magnetic head 13 when the acceleration is applied. As shown in FIG. 13B, even with the rectangular waveform, even though the current output from the two-degree-of-freedom control system shown in FIG. 9 is made smooth by the FIR filter 318, an ideal rectangular current waveform can be obtained.

Figure 14A:
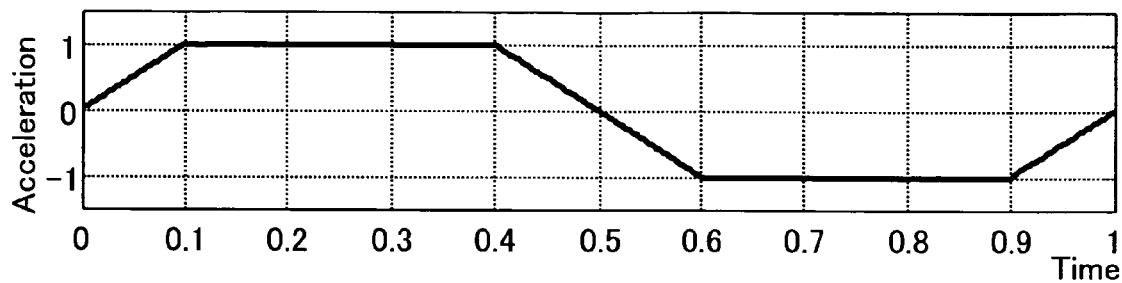
FIG. 14A shows an example of a trapezoidal wave.
Figure 14B:
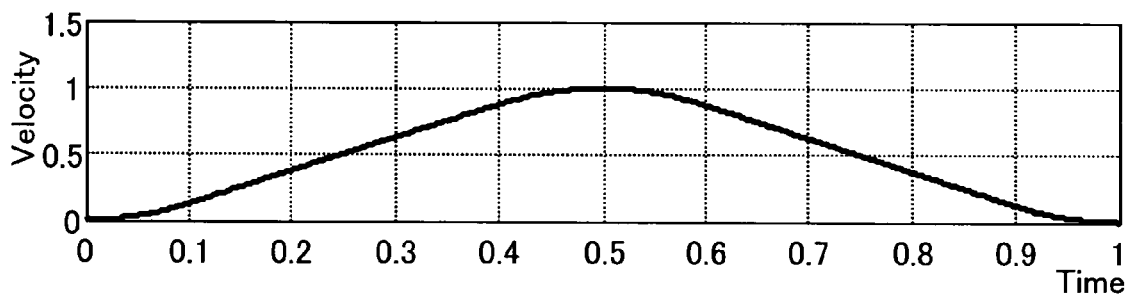
FIGS. 14B and 14C show examples of experiment results obtained when the trapezoidal wave shown in FIG. 14A is applied.
Figure 14C:
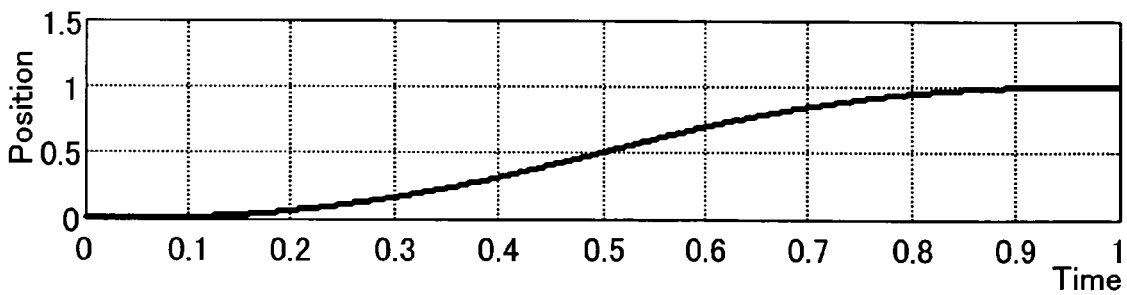
Figure 15A:
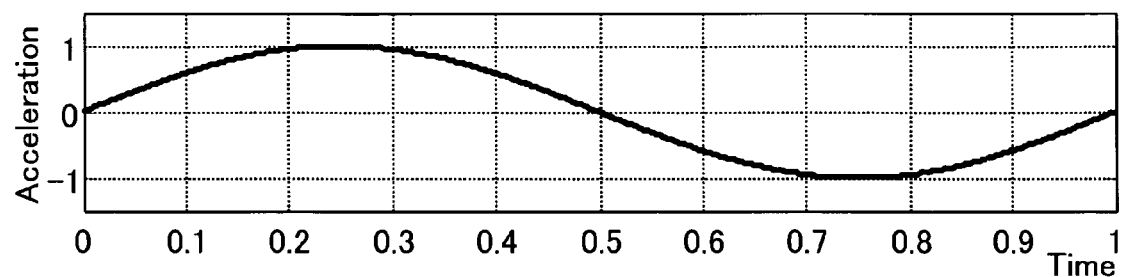
FIG. 15A shows an example of a sinusoidal wave.
Figure 15B:
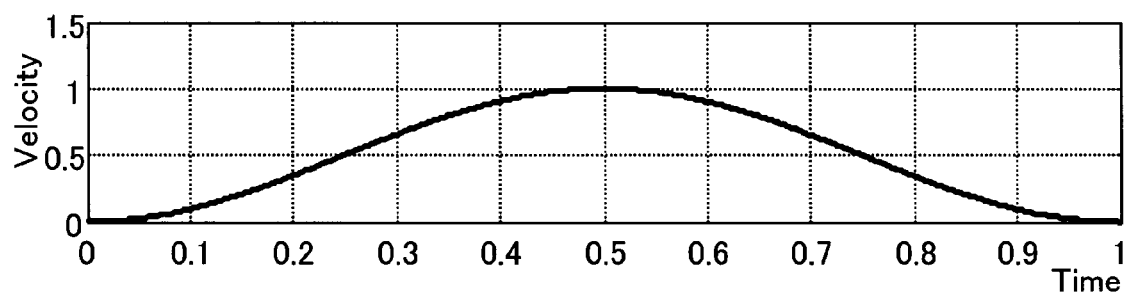
FIGS. 15B and 15C show examples of experiment results obtained when the sinusoidal wave shown in FIG. 15A is applied.
Figure 15C:
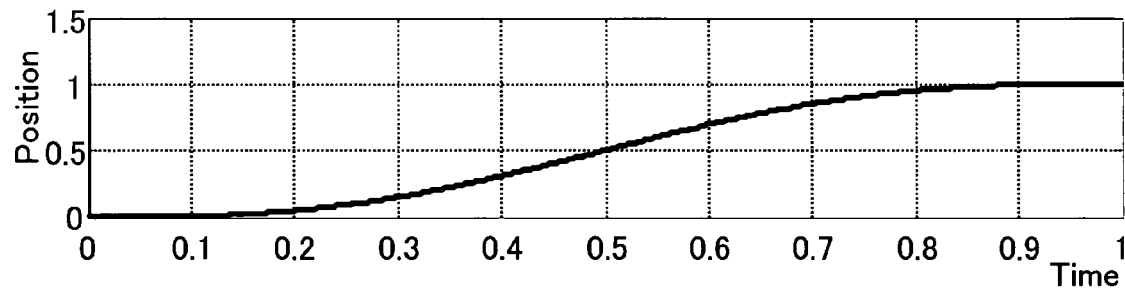

FIGS. 14 to 17 show examples of waveforms other than the rectangular wave to be applied to this control system. FIG. 14 shows an example of a case in which each orbits of the acceleration, velocity, and position output from the waveform generator 312 is expressed as trapezoidal waves, while FIG. 15 shows an example of a case in which the each orbits is expressed as sinusoidal waves.

As shown in FIGS. 14B and 15B, ideal current waveforms can be obtained even if the each orbits is expressed as trapezoidal or sinusoidal waves.

Figure 16A:
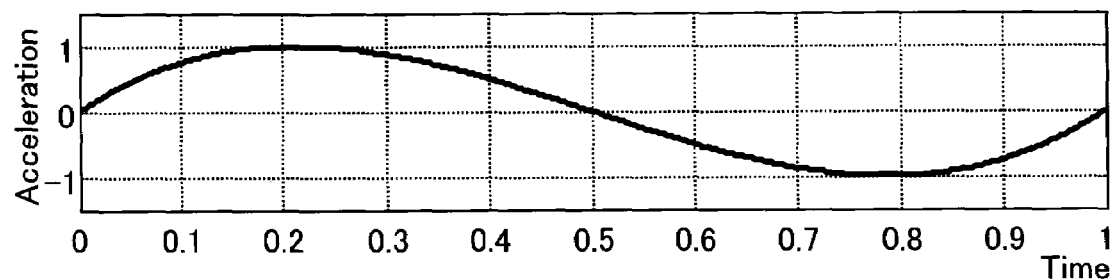
FIG. 16A shows an example of a waveform obtained from a polynomial.
Figure 16B:
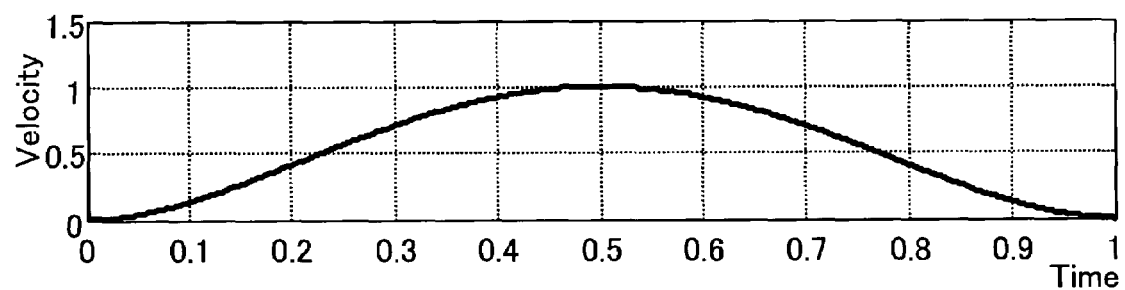
FIGS. 16B and 16C show examples of experiment results obtained when the waveform shown in FIG. 16A is applied.
Figure 16C:
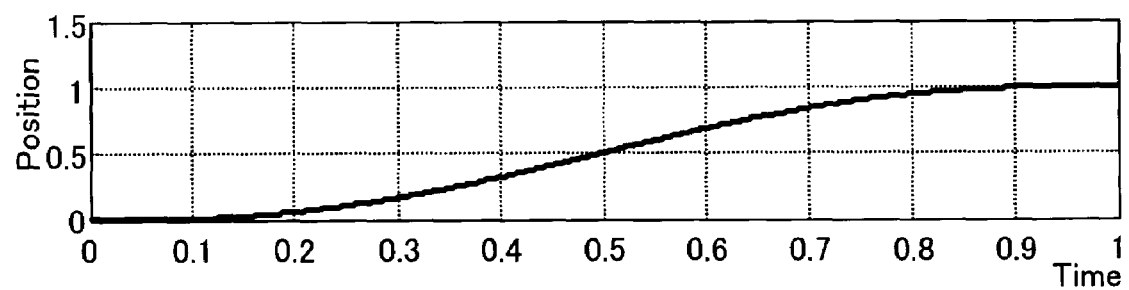
Figure 17A:
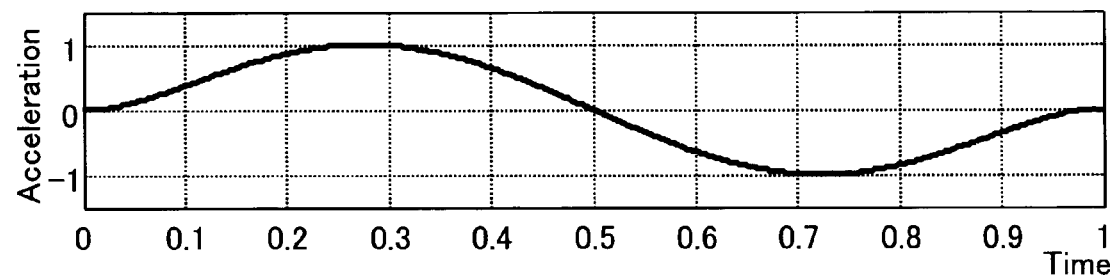
FIG. 17A shows an example of a waveform obtained from a polynomial.
Figure 17B:
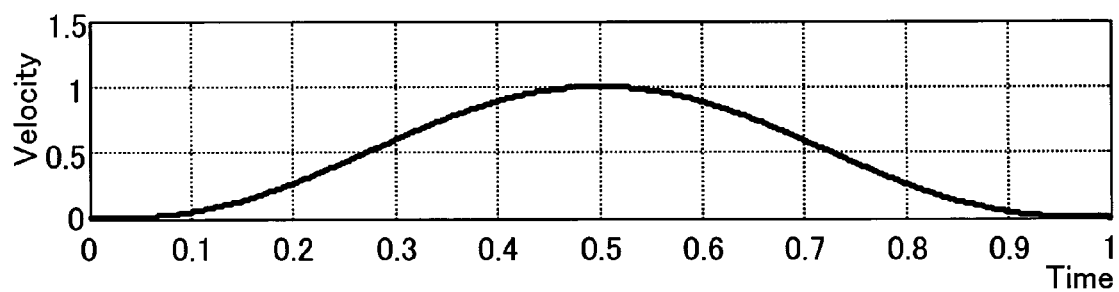
FIGS. 17B and 17C show examples of experiment results obtained when the waveform shown in FIG. 17A is applied.
Figure 17C:
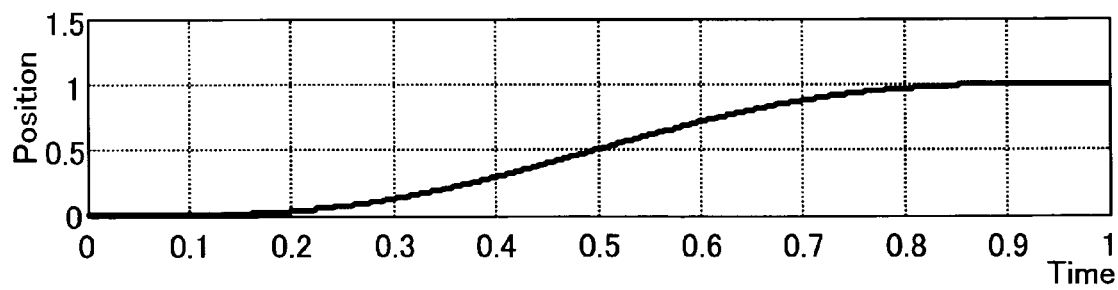

FIGS. 16 and 17 are example of cases in which each orbits of the acceleration, velocity, and position is expressed by a polynomial of the elapsed time from the movement start time of the magnetic head 13.

As described in the aforementioned Japanese Patent No. 2657561, the target position $X_1$, target velocity $X_2$, and target acceleration $X_3$, of the magnetic head 13 (or the actuator 14), can be expressed as follows.

$$X_1 = -60a[0.1(t/T)^5 - 0.25(t/T)^4 + (1/6)(t/T)^3] + a \quad (9)$$

$$X_2 = -60a[0.5(t/T)^4 - (t/T)^3 + 0.5(t/T)^2]/T \quad (10)$$

$$X_3 = -60a[2(t/T)^3 - 3(t/T)^2 + (t/T)]/T^2 \quad (11)$$

Here, a is the movement distance, t is the elapsed time following the beginning of seek control, and T is a target movement time. To simplify Equations (9) through (11), the target acceleration $X_3$, target velocity $X_2$, and target position $X_1$ are expressed respectively as follows.

$$X_3 \propto (t/T) \times (t/T - 0.5) \times (t/T - 1) \quad (12)$$

$$X_2 = \int X_3 dt \quad (13)$$

$$X_1 = \int \int X_3 dt^2 \quad (14)$$

The waveform generator 312 outputs orbits corresponding to Equations (12) through (14). FIG. 16A shows an example of the acceleration orbit output at this time. The velocity and position orbits correspond to the orbit shown in FIG. 16A.

As shown in FIG. 16B, an ideal current output waveform similar to that of the example described above can be obtained in this case also.

Furthermore, as described in the aforementioned Japanese Patent No. 2736715, the target movement orbit can be expressed as follows.

$$Vo(t/T)^k[1-(t/T)]^j \quad (15)$$

where Vo is a constant, t is the elapsed time following the start of seek control, T is the movement target time, k is an exponentiation number of two or more, and j is an exponentiation number of three or more.

To simplify Equation (15), the acceleration $X_3$, velocity $X_2$, and target position $X_1$ may be expressed respectively as follows.

$$X_3 \propto (t/T)^p \times (t/T - 0.5) \times (t/T - 1)^p \quad (16)$$

$$X_2 = \int X_3 dt \quad (17)$$

$$X_1 = \int \int X_3 adt^2 \quad (18)$$

where p is an exponentiation number.

In the example in FIG. 17A, Equation (15) is used. As shown in FIG. 17B, an ideal current output waveform can be obtained from the two-degree-of-freedom control system shown in FIG. 9 in this case also.

Similar operations and effects to those of the examples in FIG. 10 and so on can be obtained with the examples shown in FIGS. 14 through 17.

In the examples described above, the magnetic disk device 1 employing a hard disk is used as an example of a disk device. However, this embodiment may be applied to a disk device other than the magnetic disk device 1, for example an optical disk device for a disk such as a CD or DVD or a magneto-optical disk device for a disk such as an MO or MD, whereby similar operations and effects are exhibited.

This embodiment may also be applied to an information processing system having the disk device. Examples of the information processing system include a personal computer, a computer (or information recording and reproducing device) having a RAID (Redundant Array of Inexpensive Disks), a TV, a recording and reproducing device for recording and reproducing video and audio (such as a so-called HDD recorder), a portable information terminal (a PDA (Personal Digital Assistant), mobile phone, portable audio reproducing device, and so on, for example), and so on. Similar operations and effects to those of the examples described above are obtained in these cases also.

What is claimed is:

1. A control device for positioning a head by driving an actuator on which said head is carried, comprising:
   an orbit generation unit which generates three orbits of a target position, a target velocity, and a target acceleration corresponding to an elapsed time from a seek start time of said head;
   a composition unit which compounds said three orbits generated by said orbit generation unit; and
   a FIR filter for generating a target position orbit to be supplied to a two-degree-of-freedom control unit from a composite orbit output from said composite unit.

2. The control device according to claim 1, wherein said two-degree-of-freedom control unit performs seek control on said head by driving said actuator using said target position orbit.

3. The control device according to claim 2, wherein said orbit generation unit generates said three orbits which are expressed by polynomials of an elapsed time from a movement start time of said head.

4. The control device according to claim 3, wherein said polynomials are expressed as $$X_3 \propto (t/T) \times (t/T-0.5) \times (t/T-1)$$

$$X_2 = \int X_3 dt$$

$$X_1 = \int\int X_3 dt^2$$

where $X_3$ is said target acceleration, $X_2$ is said target velocity, $X_1$ is said target position, t is said elapsed time from said seek start time, and T is a seek time.

5. The control device according to claim 3, wherein said polynomials are expressed as $$X_3 \propto (t/T)^p \times (t/T-0.5) \times (t/T-1)^p$$

$$X_2 = \int X_3 dt$$

$$X_1 = \int\int X_3 dt^2$$

where $X_3$ is said target acceleration, $X_2$ is said target velocity, $X_1$ is said target position, t is said elapsed time from said seek start time, T is a seek time, and p is an exponentiation number.

6. The control device according to claim 2, wherein said orbit generation unit generates said three orbits which are expressed by any one of a rectangular wave, a sinusoidal wave, and a trapezoidal wave.

7. The control device according to claim 2, wherein said orbit generation unit has a table storing said three orbits, and generates said three orbits by reading each of said three orbits from said table in accordance with said elapsed time.

8. The control device according to claim 1, wherein said orbit generation unit generates said three orbits which are expressed by polynomials of an elapsed time from a movement start time of said head.

9. The control device according to claim 8, wherein said polynomials are expressed as $$X_3 \propto (t/T) \times (t/T-0.5) \times (t/T-1)$$

$$X_2 = \int X_3 dt$$

$$X_1 = \int\int X_3 dt^2$$

where $X_3$ is said target acceleration, $X_2$ is said target velocity, $X_1$ is said target position, t is said elapsed time from said seek start time, and T is a seek time.

10. The control device according to claim 8, wherein said polynomials are expressed as $$X_3 \propto (t/T)^p \times (t/T-0.5) \times (t/T-1)^p$$

$$X_2 = \int X_3 dt$$

$$X_1 = \int\int X_3 dt^2$$

where $X_3$ is said target acceleration, $X_2$ is said target velocity, $X_1$ is said target position, t is said elapsed time from said seek start time, T is a seek time, and p is an exponentiation number.

11. The control device according to claim 1, wherein said orbit generation unit generates said three orbits which are expressed by any one of a rectangular wave, a sinusoidal wave, and a trapezoidal wave.

12. The control device according to claim 1, wherein said orbit generation unit has a table storing said three orbits, and generates said three orbits by reading each of said three orbits from said table in accordance with said elapsed time.

13. A disk device for positioning a head to a disk, comprising:
   an actuator for driving said head;
   an orbit generation unit which generates three orbits of a target position, a target velocity, and a target acceleration corresponding to an elapsed time from a seek start time of said head;
   a composition unit which compounds said three orbits generated by said orbit generation unit;
   a FIR filter for generating a target position orbit from a composite orbit output from said composition unit; and
   a two-degree-of-freedom control unit which performs seek control on said head by driving said actuator using said target position orbit.

14. A seek orbit generation method for generating a seek orbit in order to position a head by driving an actuator on which said head is carried, comprising the steps of:
   generating three orbits of a target position, a target velocity, and a target acceleration corresponding to an elapsed time from a seek start time of said head;
   compounding said generated three orbits; and
   generating a seek orbit to be supplied to a two-degree-of-freedom control unit through a FIR filter from a compounded composite orbit.

15. A position control method for position-controlling a head by driving an actuator on which said head is carried, comprising the steps of:
   generating three orbits of a target position, a target velocity, and a target acceleration corresponding to an elapsed time from a seek start time of said head;
   compounding said generated three orbits;
   generating a seek orbit through a FIR filter from a compounded composite orbit; and
   performing seek control on said head by driving said actuator in a two-degree-of-freedom control unit to which said generated seek orbit has been supplied.

* * * * *